United States Patent [19]

Chern et al.

[11] Patent Number: 5,182,959
[45] Date of Patent: Feb. 2, 1993

[54] ANTI-ROLL DEVICE FOR MOTOR VEHICLES

[76] Inventors: Shyh Y. Chern, No. 111, Lane 41, Sec. 1, Hsin Jen Rd., Ta Li Hsiang, Taichung Hsien; Wei C. F. Chiang, No. 58, Alley 122, Liuh Shan Lane, Feng Yuan City, Taichung Hsien, both of Taiwan

[21] Appl. No.: 806,341

[22] Filed: Dec. 13, 1991

[51] Int. Cl.⁵ .............................................. B60K 41/26
[52] U.S. Cl. .................................... 74/411.5; 74/375; 74/333; 192/4 A
[58] Field of Search .................. 74/411.5, 375, 333; 192/4 A

[56] References Cited

U.S. PATENT DOCUMENTS

| Re. 17,489 | 11/1929 | Anderson | 192/4 A |
|---|---|---|---|
| Re. 19,882 | 3/1936 | Rauen | 192/4 A |
| 1,496,740 | 6/1924 | Rauen | 192/4 A |
| 1,643,989 | 10/1927 | Lynch | 192/4 A |
| 1,671,739 | 5/1928 | Paca | 192/4 A |
| 1,674,915 | 6/1928 | Nash | 192/4 A |
| 2,066,199 | 12/1936 | Renzo | 192/4 A |
| 2,070,698 | 2/1937 | Tinghir | 192/4 A |
| 2,072,057 | 2/1937 | Rauen | 192/4 A |
| 2,181,700 | 11/1939 | Leichenring, Jr. | 192/4 A |
| 2,299,765 | 10/1942 | Rauen | 192/4 A |
| 2,528,957 | 11/1950 | Husy | 192/4 A |
| 2,609,901 | 9/1952 | Raven | 192/4 A |
| 2,613,774 | 10/1952 | Neracher et al. | 192/4 A |
| 2,668,609 | 2/1954 | Dixon | 192/4 A |
| 2,672,767 | 3/1954 | Schneider | 192/4 A X |
| 2,973,845 | 3/1961 | Sinclair | 192/4 A |
| 3,645,147 | 2/1972 | Fodrea | 74/375 |
| 4,867,291 | 9/1989 | Holman et al. | 192/4 A |
| 4,969,369 | 11/1990 | Okubo et al. | 74/411.5 |
| 5,063,808 | 11/1991 | Hill | 74/411.5 |

FOREIGN PATENT DOCUMENTS 57-58512  4/1982  Japan ................................ 192/4 A Primary Examiner—Leslie A. Braun
Assistant Examiner—Andrea Pitts
Attorney, Agent, or Firm—Staas & Halsey

[57] ABSTRACT

An anti-roll device including a gear fixed on a drive shaft and a gear fixed on a driven shaft, a pinion engaged on a rod, a number of gradually narrowing notches formed in the pinion, a roller and a spring disposed in each of the notches, the rollers being biased to move toward the narrower ends of the notches, the pinion being engaged with either of the gears, the rollers being caused to be wedged between the narrower ends of the notches and the rod when the pinion rotates in one direction, thereby locking the gear and the rod together, rotation of the pinion in an opposite direction is prevented.

1 Claim, 4 Drawing Sheets

ANTI-ROLL DEVICE FOR MOTOR VEHICLES

BACKGROUND OF THE INVENTION

1. Field of the Invention

The present invention relates to an anti-roll device, and more particularly to an anti-roll device for motor vehicles.

2. Description of the Prior Art

Generally, motor vehicles with manual transmission have to use hand brake in order to prevent the motor vehicles from rolling backwards when the motor vehicle parks or stops on a ramp and when the motor vehicle is going to move upwards of the ramp. This is very dangerous particularly for a beginner.

The present invention has arisen to mitigate and/or obviate the afore-described disadvantages of the motor vehicles.

SUMMARY OF THE INVENTION

The primary objective of the present invention is to provide an anti-roll device for a motor vehicle in which the motor vehicle can be prevented from rolling backwards during climbing up a hill and the like.

In accordance with one aspect of the invention, there is provided an anti-roll device including a gear box, a first shaft and a second shaft disposed in parallel in the gear box, a first gear fixed on the first shaft and rotated in concert with the first shaft, a second gear fixed on the second shaft and rotated in concert with the second shaft, a plate fixed to the gear box and having a pair of lugs extended therefrom, a rod fixed between the lugs, a third gear having an opening formed in a center thereof for engagement on the rod and having a plurality of notches formed therein, each of the notches having a gradually narrowing passage formed therein and having a roller and a spring disposed therein, each of the notches having a narrower end, the rollers being biased to move toward the narrower ends of the notches, the third gear being engaged with either of the first gear or the second gear, the rollers being caused to be wedged between the narrower ends of the notches and the rod when the third gear rotates in a first direction, thereby locking the gear and the rod together, rotation of the third gear in an opposite direction tending to roll the rollers against the springs so that the third gear may rotate freely in the opposite direction.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
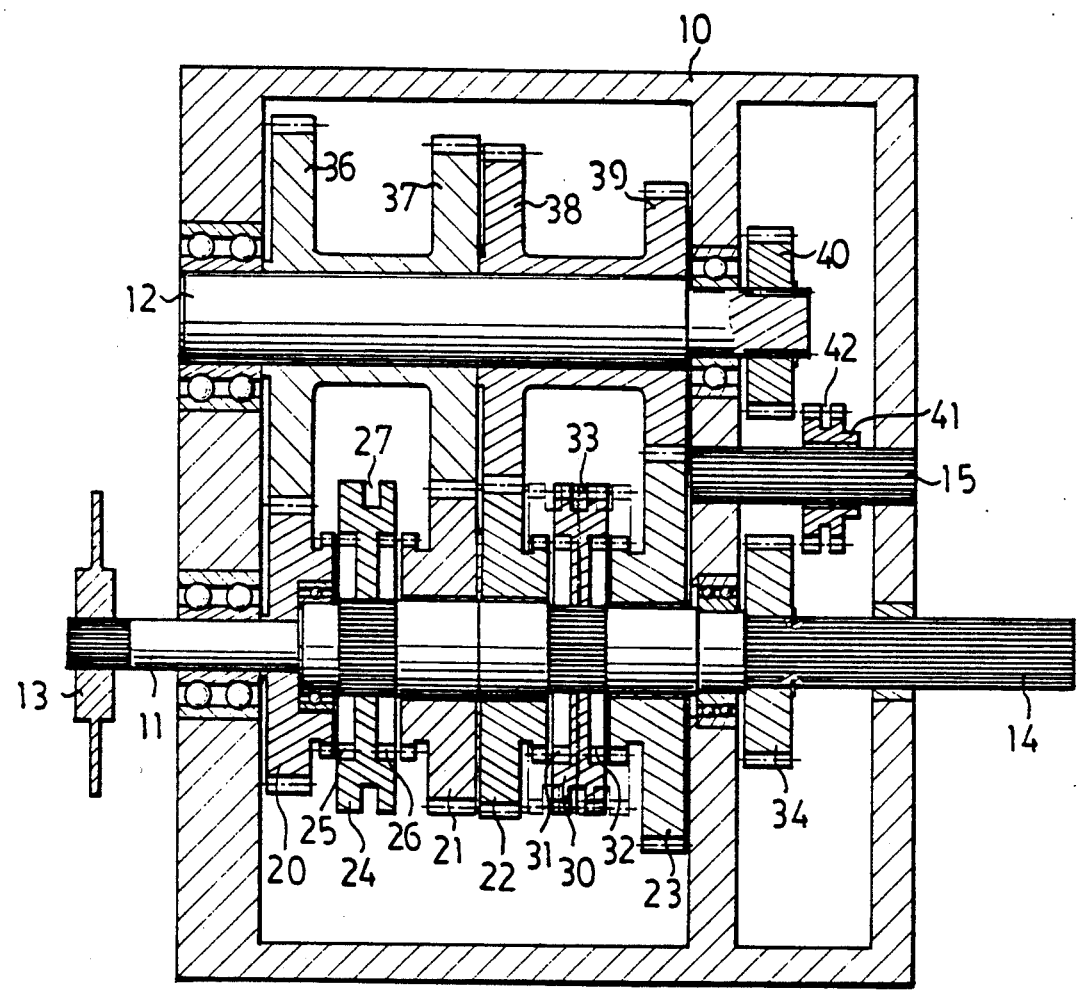
FIG. 1 is a cross sectional view of a typical gear box having a speed transmission mechanism disposed therein.

Referring to FIG. 1, a typical four speed gear shifting of a motor vehicle is disclosed and includes a gear box 10 having an input shaft 11 and a driven shaft 12 rotatably disposed therein and parallel with each other, a clutch disc 13 fixed on the input shaft 11 and driven by the motor of the vehicle (not shown) so that the input shaft 11 can be rotated, an output shaft 14 rotatably disposed in the gear box 10 and coaxially disposed on the input shaft 11, and an axle 15 rotatably disposed in the gear box 10 and parallel to both the driven shaft 12 and the output shaft 14. The output shaft 14 has a plurality of teeth longitudinally formed on the outer surface thereof. Five gears 36, 37, 38, 39, 40 are fixed on the driven shaft 12 and rotated in concert with the driven shaft 12. A gear 34 is fixed On the output shaft 14. The wheels of the vehicle are coupled to the output shaft.

A first gear/pinion 20 is fixed on the input shaft 11 and rotated in concert with the input shaft 11. A second gear/pinion 21, a third gear/pinion 22 and a fourth gear/pinion 23 are rotatably and independently disposed on the output shaft 14. The gear portion of the gear/pinions 20 to 23 are engaged with the gears 36 to 39 respectively so that the gears 36 to 40 can be driven by the gear portion of the first gear/pinion 20 and the gear/pinions 21, 22 and 23 can be driven by the gears 37, 38, 39 respectively. The pinion portions of the gear/pinions 20, 21, 22, 23 have an identical pitch diameter, however, the pitch diameters of the gear portions are gradually increased from that of the gear/pinion 20 to that of the gear/pinion 23. A disc 24 is provided between the first gear/pinion 20 and the second gear/pinion 21 and a disc 30 is provided between the third gear/pinion 22 and the fourth gear/pinion 23. The discs 24, 30 have internal gears slidably engaged with the teeth of the output shaft 14 (FIG. 2) so that the discs 24, 30 are slidable along the output shaft 14 and rotated in concert with the output shaft 14. The disc 24 includes internal gears 25, 26 formed on both sides thereof for engagement with the pinion portions of the first and second gear/pinions 20, 21 respectively, and the disc 30 includes internal gears 31, 32 formed on both sides thereof for engagement with the pinion portions of the third and fourth gear/pinions 22, 23 respectively.

Each of the discs 24, 30 has an annular groove 27, 33 formed in the outer peripheral surface thereof for engagement with a shifting lever 28 which is slidable along an axle 29 (FIG. 2) so that the discs 24, 30 can be caused to move along the output shaft 14 in order to engage with the pinion portions of the gear/pinions 20 to 23 respectively. When the disc 30 is engaged with the pinion portion of the fourth gear/pinion 23, the lowerest gear ratio, i.e. the first speed of the vehicle is obtained, the vehicle can thus be started to move forward, and when the disc 24 is engaged with the pinion portion of the first gear/pinion 20, the largest gear ratio, i.e. the fourth speed of the vehicle is obtained, the vehicle can move forward in the fastest speed. Similarly, a pinion 41 has internal gears slidably engaged with the teeth formed on the outer peripheral surface of the axle 15 so that the pinion 41 is movable along the axle 15 and rotated in concert with the axle 15. The pinion 41 has an annular groove 42 formed in the outer peripheral surface thereof for engagement with a shifting lever 43 (FIG. 7) which is slidably engaged on an axle 44 so that the pinion 42 can be caused to move along the axle 15 in order to engage with the gears 34 and 40 simultaneously. At this moment, the output shaft 14 rotates in a reverse direction so that the vehicle can move rearwards.

Figure 2:
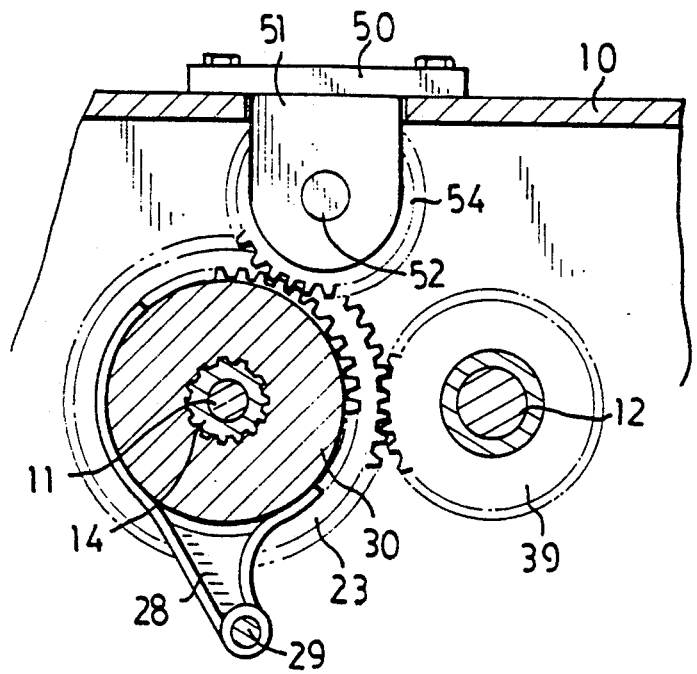
FIG. 2 is a plane view of an anti-roll device in accordance with the present invention, which is engaged with the gear with lowerest gear ratio.
Figure 3:
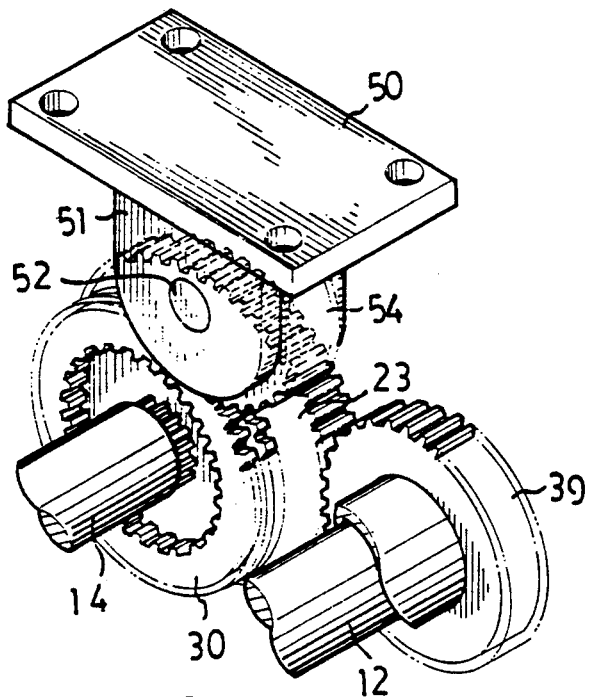
FIG. 3 is a perspective view of the anti-roll device as shown in FIG. 2.
Figure 4:
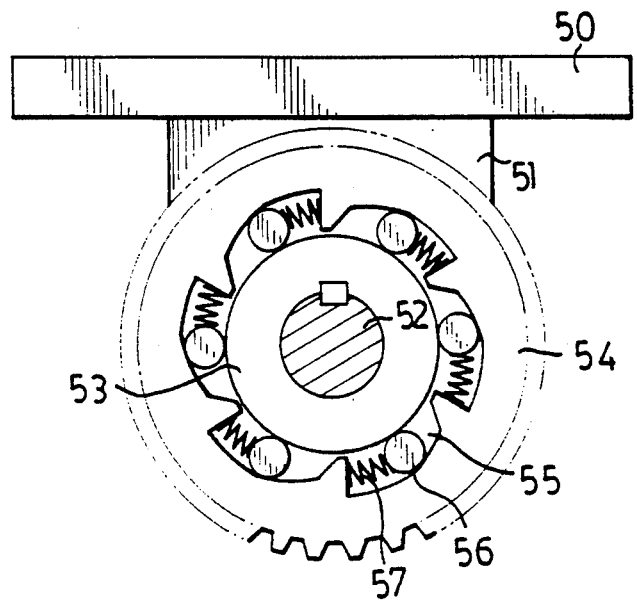
FIG. 4 is a plane view of the anti-roll device, in which, for clear illustration purposes, part of the mounting bracket is removed.
Figure 5:
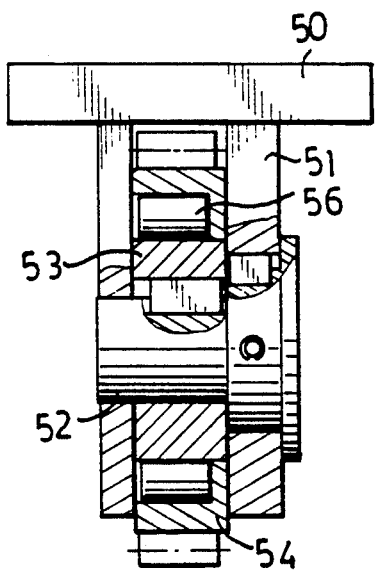
FIG. 5 is a partial cross sectional view of the 7. anti-roll device.

Referring next to FIGS. 2 to 5, an anti-roll device comprises generally a plate 50 fixed to the gear box 10 and having a pair of lugs 51 integrally extended therefrom. A rod 52 is disposed between the lugs 51 and has a ring 53 disposed thereon. A gear 54 has an opening formed in the center thereof for rotatably engaging on the ring 53 and has six equally spaced notches 55 formed therein for the reception of rollers 56 and springs 57. Each of the notches 55 has a gradually narrowing passage or chamber formed therein. The rollers 56 are biased toward the narrower ends of the notches 55 by the springs 57. As shown in FIG. 4, the rollers 56 are caused to be wedged between the narrower ends of the notches 55 and the ring 53 when the gear 54 rotates clockwise, thereby locking the gear 54 and the ring 53 together, rotation of the gear 54 in the opposite direction tending to roll the rollers 56 out of driving engagement, so that the gear 5 may rotate freely counterclockwise. The disc 30 has a plurality of teeth formed on the outer peripheral surface thereof.

As shown in FIGS. 2 and 3, when the disc 30 is caused to move along the output shaft 14 and is caused to move toward the fourth gear/pinion 23 and when the internal gear 32 of the disc 30 is engaged with the pinion portion of the fourth gear/pinion 23, the lowerest gear ratio is obtained. The teeth formed on the outer peripheral surface of the disc 30 are caused to engage with the gear 54 when the disc 30 moves toward the fourth gear/pinion 23, the notches 55 and the rollers 56 are arranged such that the output shaft 14 can be rotated in the forward direction only. Thereby, the vehicle can be prevented from rolling backward, especially when climbing up a hill. It is to be noted that the gear 54 is engaged with the disc 30 only when the disc 30 moves toward the fourth gear/pinion 23.

Figure 6:
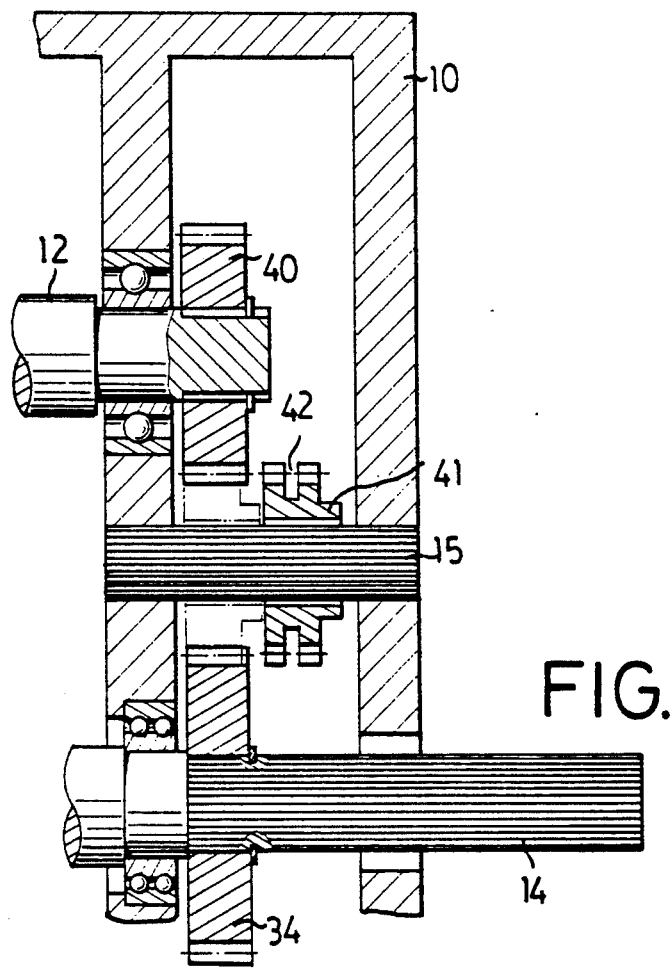
FIG. 6 is a partial cross sectional view of the gear box.
Figure 7:
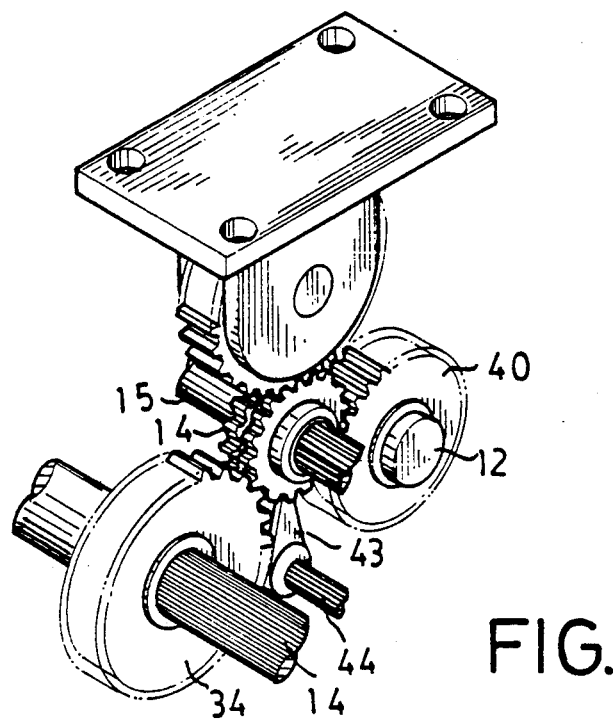
FIG. 7 is a perspective view of the anti-roll device which is engaged with the backward gear.

Similarly, as shown in FIGS. 6 and 7, when the pinion 41 is caused to engage with the gears 34, 40 so that the vehicle can move rearward, the notches 55 and the rollers 56 are arranged such that the output shaft 14 can be rotated in the rearward direction only. Thereby, the vehicle can be prevented from rolling forward.

Accordingly, the anti-roll device can prevent the vehicle from rolling backwards when the vehicle moves upward a hill.

Alternatively, without the ring 53, the rollers 56 can be directly engaged between the rod 52 and gear 54.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An anti-roll device comprising a gear box, an input shaft and a driven shaft disposed in parallel in said gear box, a first gear fixed on said input shaft and rotated in concert with said input shaft, a second gear and a third gear fixed on said driven shaft and rotated in concert with said driven shaft, said second gear being engaged with said first gear so that said second gear and said third gear can be rotated by said first gear, an output shaft rotatably disposed in said gear box and coaxially disposed on said input shaft, said output shaft including a plurality of teeth formed on an outer peripheral surface thereof, a gear/pinion rotatably disposed on said output shaft and having a pinion portion, a disc engaged on said output shaft and having a plurality of first internal gears formed therein for sliding engagement with said teeth of said output shaft so that said disc is slidable longitudinally along said output shaft and rotated in concert with said output shaft, said disc further including a plurality of second internal gears formed therein for engagement with said pinion portion of said gear/pinion, said disc including an annular groove formed in an outer peripheral surface thereof, a shifting lever engaged in said annular groove of said disc for shifting said second internal gears of said disc to engage with said pinion portion of said gear/pinion, a plate fixed to said gear box and having a pair of lugs extended therefrom, a rod fixed between said lugs, a ring fixed on said rod, a fourth gear having an opening formed in a center thereof for engagement on said ring and having a plurality of notches formed therein, each of said notches having a gradually narrowing passage formed therein and having a roller and a spring disposed therein, each of said notches having a narrower end, said rollers being biased to move toward said narrower ends of said notches, said forth gear being engaged with said teeth of said disc when said disc moves toward said gear/pinion, said rollers being caused to be wedged between said narrower ends of said notches and said ring when said fourth gear rotates in a first direction, thereby locking said gear and said ring together, rotation of said fourth gear in an opposite direction tending to roll said rollers against said springs so that said fourth gear may rotate freely in said opposite direction.

* * * * *